United States Patent
Murayama et al.

(10) Patent No.: US 9,447,623 B2
(45) Date of Patent: Sep. 20, 2016

(54) VEHICLE DOOR CHECKER

(71) Applicant: RIKENKAKI KOGYO KABUSHIKI KAISHA, Sakado-shi, Saitama (JP)

(72) Inventors: Yuji Murayama, Sakado (JP); Jun Asakura, Sakado (JP)

(73) Assignee: Rikenkaki Kogyo Kabushiki Kaisha, Saitama (JP)

( * ) Notice: Subject to any disclaimer, the term of this patent is extended or adjusted under 35 U.S.C. 154(b) by 0 days.

(21) Appl. No.: 14/795,096

(22) Filed: Jul. 9, 2015

(65) Prior Publication Data
US 2016/0024828 A1 Jan. 28, 2016

(30) Foreign Application Priority Data

Jul. 25, 2014 (JP) ................................. 2014-152286

(51) Int. Cl.
*E05F 5/06* (2006.01)
*B60J 5/00* (2006.01)

(52) U.S. Cl.
CPC .. *E05F 5/06* (2013.01); *B60J 5/00* (2013.01); *Y10T 16/615* (2015.01)

(58) Field of Classification Search
CPC . Y10T 16/615; Y10T 16/61; Y10T 16/6295; Y10T 16/6285; Y10T 16/629; B60J 5/00; E05F 5/00; E05F 5/06; E05F 5/025; E05C 17/203; E05C 17/206; E05Y 2900/531
USPC ........ 16/83, 82, 86 A, 86 B, 86 C; 292/262, 292/265; 296/146.11, 146.12
See application file for complete search history.

(56) References Cited

U.S. PATENT DOCUMENTS

| | | | | |
|---|---|---|---|---|
| 6,113,832 A * | 9/2000 | Tanaka | ................ | B29C 45/0005 264/108 |
| 6,842,943 B2 * | 1/2005 | Hoffmann | ............. | E05C 17/203 16/50 |
| 7,076,833 B2 * | 7/2006 | Murayama | ............ | E05C 17/203 16/82 |
| 7,143,473 B2 * | 12/2006 | Matsuki | ................ | E05C 17/206 16/82 |
| 7,240,399 B2 * | 7/2007 | Murayama | ............ | E05C 17/203 16/82 |
| 7,506,406 B2 * | 3/2009 | Murayama | ............ | E05C 17/203 16/82 |

(Continued)

FOREIGN PATENT DOCUMENTS

JP     2014-034865 A    2/2014

*Primary Examiner* — William Miller
(74) *Attorney, Agent, or Firm* — Carrier Blackman & Associates, P.C.; Joseph P. Carrier; Anne G. Sabourin

(57) ABSTRACT

A door checker includes a stopper provided to a tip portion of a check lever and defining a door opening limit by engaging with stopper surfaces provided to an outer surface of a peripheral edge of a through-hole in a support body. The stopper is formed from paired first stopper portions engageable with paired first stopper surfaces arranged side-by-side with the through-hole therebetween, and paired second stopper portions engageable with paired second stopper surfaces. The first stopper portions are formed from metal-made protrusions integrally projecting from opposite sides of a tip portion of a lever core plate, and projecting from an outer surface of a synthetic resin-made covering portion. The second stopper portions are formed from synthetic resin-made portions of the outer surface located between the first stopper portions and swollen on opposite sides in a direction orthogonal to an arrangement direction of the first stopper portions.

12 Claims, 11 Drawing Sheets

(56) References Cited

U.S. PATENT DOCUMENTS

| | | | | |
|---|---|---|---|---|
| 2003/0051312 A1* | 3/2003 | Hoffmann | ............ | E05C 17/203 16/50 |
| 2004/0075285 A1* | 4/2004 | Murayama | ............ | E05C 17/203 292/265 |
| 2004/0111832 A1* | 6/2004 | Murayama | ............ | E05C 17/203 16/82 |
| 2004/0251696 A1* | 12/2004 | Murayama | ............ | E05C 17/203 292/262 |
| 2006/0150366 A1* | 7/2006 | Matsuki | ................ | E05C 17/206 16/82 |
| 2007/0241569 A1* | 10/2007 | Kitayama | ............. | E05C 17/203 292/262 |
| 2008/0066260 A1* | 3/2008 | Clark | .................... | E05C 17/203 16/86 A |
| 2012/0233813 A1* | 9/2012 | Settsu | ....................... | E05F 5/00 16/82 |
| 2012/0246871 A1* | 10/2012 | Settsu | ..................... | E05F 5/025 16/83 |
| 2014/0041154 A1 | 2/2014 | Kamata et al. | | |
| 2014/0059802 A1* | 3/2014 | Matsuki | .................. | E05F 5/025 16/82 |
| 2015/0354259 A1* | 12/2015 | Broadhead | ................ | E05F 5/06 16/82 |

* cited by examiner

IN THE CASE OF CONTACT OF STOPPER IN PROPER POSTURE

IN THE CASE OF PARTIAL CONTACT OF STOPPER

IN THE CASE OF CONTACT OF STOPPER IN PROPER POSTURE

IN THE CASE OF PARTIAL CONTACT OF STOPPER

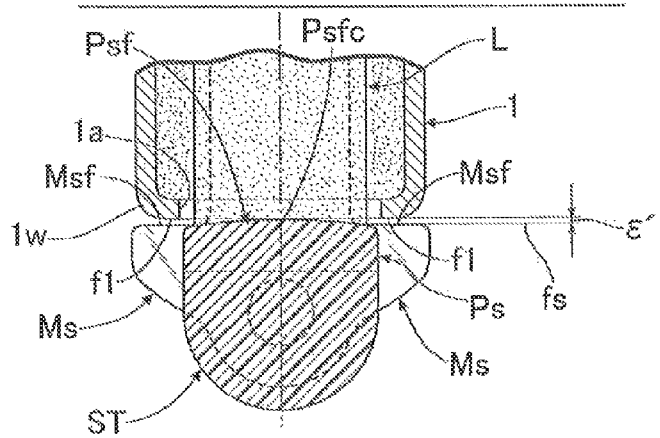
FIG.9A IN THE CASE OF CONTACT OF STOPPER IN PROPER POSTURE (IN STATE WHERE SECOND STOPPER PORTIONS START CONTACT)
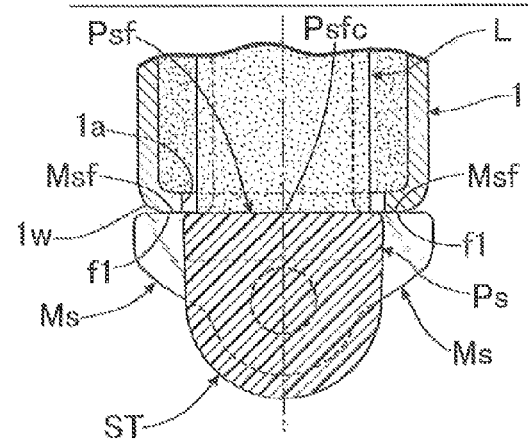
FIG.9B IN THE CASE OF CONTACT OF STOPPER IN PROPER POSTURE (IN STATE WHERE FIRST STOPPER PORTIONS START CONTACT)
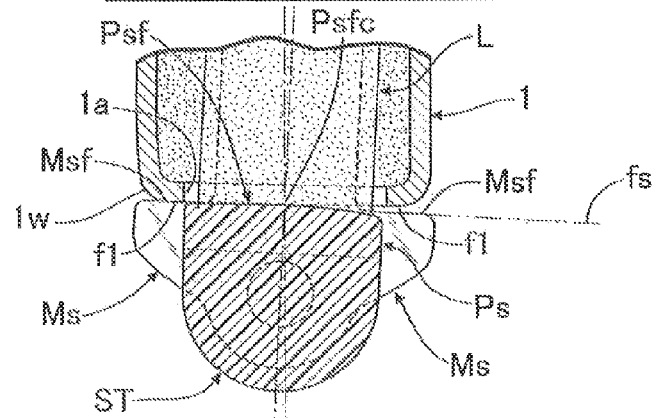
FIG.9C IN THE CASE OF PARTIAL CONTACT OF STOPPER

IN ATTACHED STATE OF RUBBER COVER

IN NON-ATTACHED STATE OF RUBBER COVER

VEHICLE DOOR CHECKER

CROSS REFERENCE TO RELATED APPLICATIONS

The present application claims priority under 35 U.S.C. §119 to Japanese Patent Application No. 2014-152286 filed Jul. 25, 2014 the entire contents of which are hereby incorporated by reference.

BACKGROUND OF THE INVENTION

1. Field of the Invention

The present invention relates to an improvement of a vehicle door checker comprising: a check lever having a base portion pivotally supported by one of a vehicle body and a door; a support body made of a metal plate, including a through-hole for slidable insertion of the check lever therethrough, and fixedly attached to the other of the vehicle body and the door; and a stopper provided to a tip portion of the check lever and defining an opening limit of the door by engaging with stopper surfaces provided to an outer surface of a peripheral edge of the through-hole in the support body, especially, relates to an improvement of the vehicle door checker, wherein the check lever includes a metal-made core plate extending in a longitudinal direction of the lever, and a synthetic resin-made covering portion integrally covering the core plate.

2. Description of the Related Art

A door checker used for a vehicle, for example, an automobile, is known as disclosed in Japanese Patent Application Laid-open No. 2014-34865.

In the above-mentioned conventional vehicle door checker, an entire surface of the metal-made core plate of the check lever is covered with the synthetic resin-made covering portion. For this reason, synthetic-resin parts of the covering portion which form the stopper portions is directly engaged with the stopper surfaces of the support body, and receive load produced by opening the door. Thus, the resin stopper portions may be cracked, separated, damaged, relatively early deteriorated, and so on, by impact at the time of engagement of the resin stopper portions with the stopper surfaces, particularly by impact at the time when the door is vigorously opened due to being hit by a gust of wind or due to for any other reason.

SUMMARY OF THE INVENTION

The present invention has been made with the foregoing situation taken into consideration. An object of the present invention is to provide a vehicle door checker capable of solving the above-mentioned problems with a simple structure.

In order to achieve the object, according to a first aspect of the present invention, there is provided a vehicle door checker comprising: a check lever having a base portion pivotally supported by one of a vehicle body and a door; a support body made of a metal plate, including a through-hole for slidable insertion of the check lever therethrough, and fixedly attached to the other of the vehicle body and the door; and a stopper provided to a tip portion of the check lever and defining an opening limit of the door by engaging with stopper surfaces provided to an outer surface of a peripheral edge of the through-hole in the support body, wherein the check lever includes a metal-made core plate extending in a longitudinal direction of the lever, and a synthetic resin-made covering portion integrally covering the core plate, wherein the stopper surfaces includes a pair of first stopper surfaces arranged side-by-side with the through-hole interposed therebetween, and a pair of second stopper surfaces arranged side-by-side with the through-hole interposed therebetween in a direction orthogonal to an arrangement direction of the first stopper surfaces, the stopper is formed from a pair of first stopper portions engageable with the pair of first stopper surfaces, respectively, and a pair of second stopper portions engageable with the pair of second stopper surfaces, respectively, the pair of first stopper portions are formed from a pair of metal-made protrusions provided projectingly and integrally on opposite sides of a tip portion of the core plate and projecting from an outer surface of the covering portion, and the pair of second stopper portions are formed from a pair of synthetic resin-made swelling portions which are portions of the outer surface of the covering portion located between the pair of first stopper portions and swollen on one side and an opposite side, respectively, in a direction orthogonal to an arrangement direction of the first stopper portions.

According to the first aspect, the vehicle door checker is configured as follows. The check lever includes: the metal-made core plate extending in the longitudinal direction of the lever; and the synthetic resin-made covering portion integrally covering the core plate. The stopper surfaces provided to the support body are formed from: the pair of first stopper surfaces arranged side-by-side with the through-hole interposed therebetween; and the pair of second stopper surfaces arranged side-by-side with the through-hole interposed therebetween in the direction orthogonal to the arrangement direction of the first stopper surfaces. The pair of first stopper portions respectively engageable with the pair of first stopper surfaces are formed from the pair of metal-made protrusions provided projectingly and integrally on the opposite sides of the tip portion of the core plate, and projecting from the outer surface of the covering portion. In addition, the pair of second stopper portions respectively engageable with the pair of second stopper surfaces are formed from the pair of synthetic resin-made swelling portions which are portions of the outer surface of the covering portion located between the pair of first stopper portions and swollen on the one side and the opposite side, respectively, in the direction orthogonal to the arrangement direction of the first stopper portions. For these reasons, the pair of first stopper portions can be obtained by just projecting the parts of the metal-made core plate from the outer surface of the covering portion, and the pair of second stopper portions can be obtained by just swelling the parts of the synthetic resin-made covering portion. It is possible for the first and second stopper portions to receive load produced by opening the door such that the load is widely dispersed over the support body. Thereby, load burden on the stopper surfaces on the support body side can be reduced using a simple structure as a whole, and load burden on the synthetic resin-made second stopper portions can be reduced as well. Accordingly, it is possible to make great contribution to enhancement of durability of the various parts of the door checker.

According to a second aspect of the present invention, in addition to the first aspect, the pair of second stopper portions are arranged in a direction along a rotation axis of the check lever, surfaces of the second stopper portions, which face the second stopper surfaces, are each formed in a convex arc shape as seen in a projection plane orthogonal to the rotation axis, and the surfaces of the second stopper portions, which face the second stopper surfaces, are formed such that central portions of the surfaces are placed on an imaginary plane passing through surfaces of the pair of first stopper portions which face the first stopper surfaces, respectively, or such that the central portions retreat from the imaginary plane by a predetermined amount in a direction opposite from the second stopper surfaces.

According to the second aspect, the load produced by opening the door can be securely received mainly by engagement of the pair of metal-made first stopper portions with the pair of first stopper surfaces. In addition, even in a case where only one of the pair of first stopper portions is engaged with its corresponding first stopper surface due to partial contact, dispersion of the load produced by opening the door can be achieved by engaging the synthetic resin-made second stopper portions with the second stopper surfaces, since the support body is deformed in the first stopper surface with which the one first stopper portion is engaged due to the partial contact, and in the vicinity of the first stopper surface. For this reason, it is possible to make contribution to reducing load burden on the support body, thereby enhancing durability. Furthermore, contact surfaces of the second stopper portions with the second stopper surfaces each have a cross section with a convex arc shape. For this reason, surface contact of the second stopper portions with the second stopper surfaces is satisfactory so that stress on contact parts can be dispersed. Accordingly, it is possible to make contribution to further enhancing the durability of the synthetic resin-made second stopper portions.

According to a third aspect of the present invention, in addition to the first aspect, the pair of second stopper portions are arranged in a direction along a rotation axis of the check lever, surfaces of the second stopper portions, which face the second stopper surfaces, are each formed in a convex arc shape as seen in a projection plane orthogonal to the rotation axis, and the surfaces of the second stopper portions, which face the second stopper surfaces, are formed such that central portions of the surfaces project, by a predetermined amount, toward the second stopper surfaces from an imaginary plane passing through surfaces of the pair of first stopper portions which face the first stopper surfaces, respectively.

According to the third aspect, when the door reaches an opening limit, proper engagement of the pair of first stopper portions with the pair of first stopper surfaces while in parallel with each other is achieved by: first of all, engaging the synthetic resin-made second stopper portions with the second stopper surfaces; and thereafter engaging the metal-made first stopper portions with the first stopper surfaces. For this reason, impact caused by their engagement can be effectively eased and absorbed by elastic deformation of the second stopper portions which occurs first, and occurrence of impact noise can be effectively prevented. In addition, since the metal-made first stopper portions are engaged with the first stopper surfaces, it is possible to securely avoid excessive elastic deformation of the synthetic resin-made second stopper portions. Furthermore, the contact surfaces of the second stopper portions with the second stopper surfaces each have the cross section with the convex arc shape. For this reason, the surface contact of the second stopper portions with the second stopper surfaces is satisfactory so that the stress on the contact parts can be dispersed. Accordingly, it is possible to make contribution to further enhancing the durability of the synthetic resin-made second stopper portions.

According to a fourth aspect of the present invention, in addition to any one of the first to third aspects, an anchor hole is penetratingly formed in the tip portion of the core plate, and is filled with the synthetic resin material of the covering portion, and the pair of second stopper portions are integrally connected together via the synthetic resin material in the anchor hole.

According to the fourth aspect, the pair of synthetic resin-made second stopper portions placed respectively on opposite sides of the metal-made core plate can be integrally connected together by the synthetic resin material which is filled and buried in the anchor hole in the tip portion of the core plate. For this reason, even if the load produced by opening the door is repeatedly applied to the second stopper portions, it is possible to effectively prevent each second stopper portion from coming off the core plate.

According to a fifth aspect of the present invention, in addition to any one of the first to fourth aspects, a rubber cover integrally including a pair of rubber covering portions is attached to the tip portion of the check lever, the pair of rubber covering portions covering the surfaces of the pair of second stopper portions which face the second stopper surfaces, the rubber cover is provided with any one of a through-hole and a cutout through which the surfaces of the pair of first stopper portions facing the first stopper surfaces are exposed to outside, and surfaces of the rubber covering portions which face the second stopper surfaces project, by a predetermined amount, toward the second stopper surfaces from the imaginary plane passing through the surfaces of the pair of first stopper portions which face the first stopper surfaces.

According to the fifth aspect, the rubber cover integrally including the pair of rubber covering portions is attached to the tip portion of the check lever, the pair of rubber covering portions covering the surfaces of the pair of second stopper portions which face the second stopper surfaces. The surfaces of the rubber covering portions, which face the second stopper surfaces, project, by the predetermined amount, toward the second stopper surfaces from the imaginary plane passing through the surfaces of the pair of first stopper portions which face the first stopper surfaces. Therefore, when the door is opened, the rubber covering portions of the rubber cover shock-absorbingly abut against the second stopper surfaces immediately before the opening limit of the door which is restricted by engagement of the first and second stopper portions with the first and second stopper surfaces. Thereby, the rubber covering portions are capable of effectively absorbing and easing impact which is caused when the door reaches the opening limit. Accordingly, the shock-absorbing effect can enhance the durability of the synthetic resin-made second stopper portions and the support body, and can effectively reduce impact load on the door supporting the support body, and the vehicle body. Moreover, since the through hole or the cutout through which the surfaces of the pair of first stopper portions facing the first stopper surfaces are exposed to the outside is formed in the rubber cover, it is possible to securely restrict the opening limit of the door by engaging the metal-made first stopper portions directly with the first stopper surfaces with no rubber cover interposed therebetween, and to effectively prevent damage of the rubber cover due to the engagement.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 7A shows a case of contact of the stopper portions with the stopper surfaces in a proper posture; and FIG. 7B shows a case of partial contact of the stopper portions with the stopper surfaces.

FIGS. 9A to 9C are sectional views corresponding to FIGS. 7A and 7B and each showing a door checker of a third embodiment of the present invention.

FIG. 10A shows an attached state of a rubber cover; and FIG. 10B shows a non-attached state of the rubber cover.

DESCRIPTION OF THE PREFERRED EMBODIMENTS

Descriptions will be hereinbelow provided for embodiments of the present invention on the basis of the accompanying drawings. To begin with, a first embodiment will be described with reference to FIGS. 1 to 7.

Figure 1:
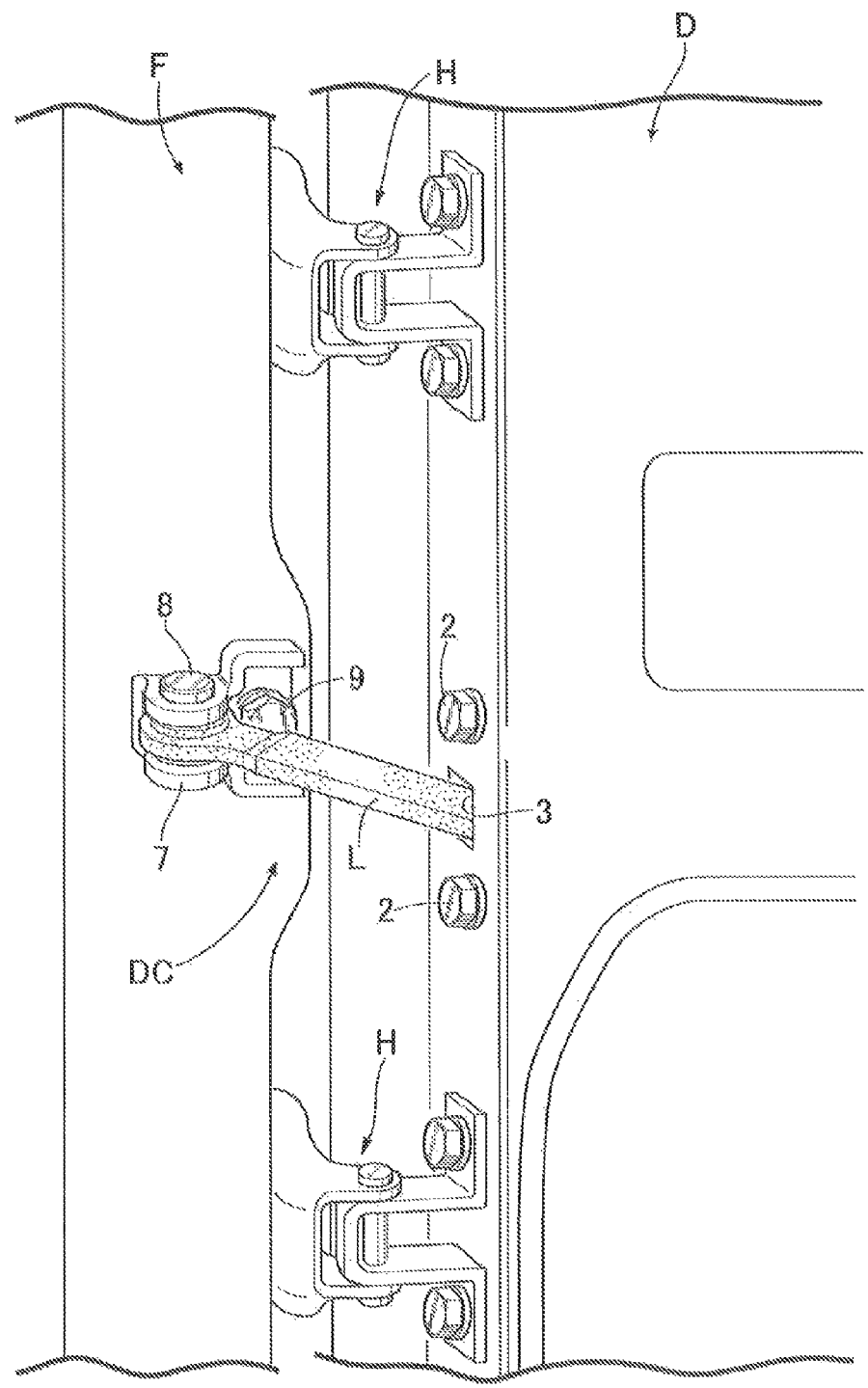
FIG. 1 is a perspective view of a main part of an automobile to which a door checker of a first embodiment of the present invention is attached.
Figure 2:
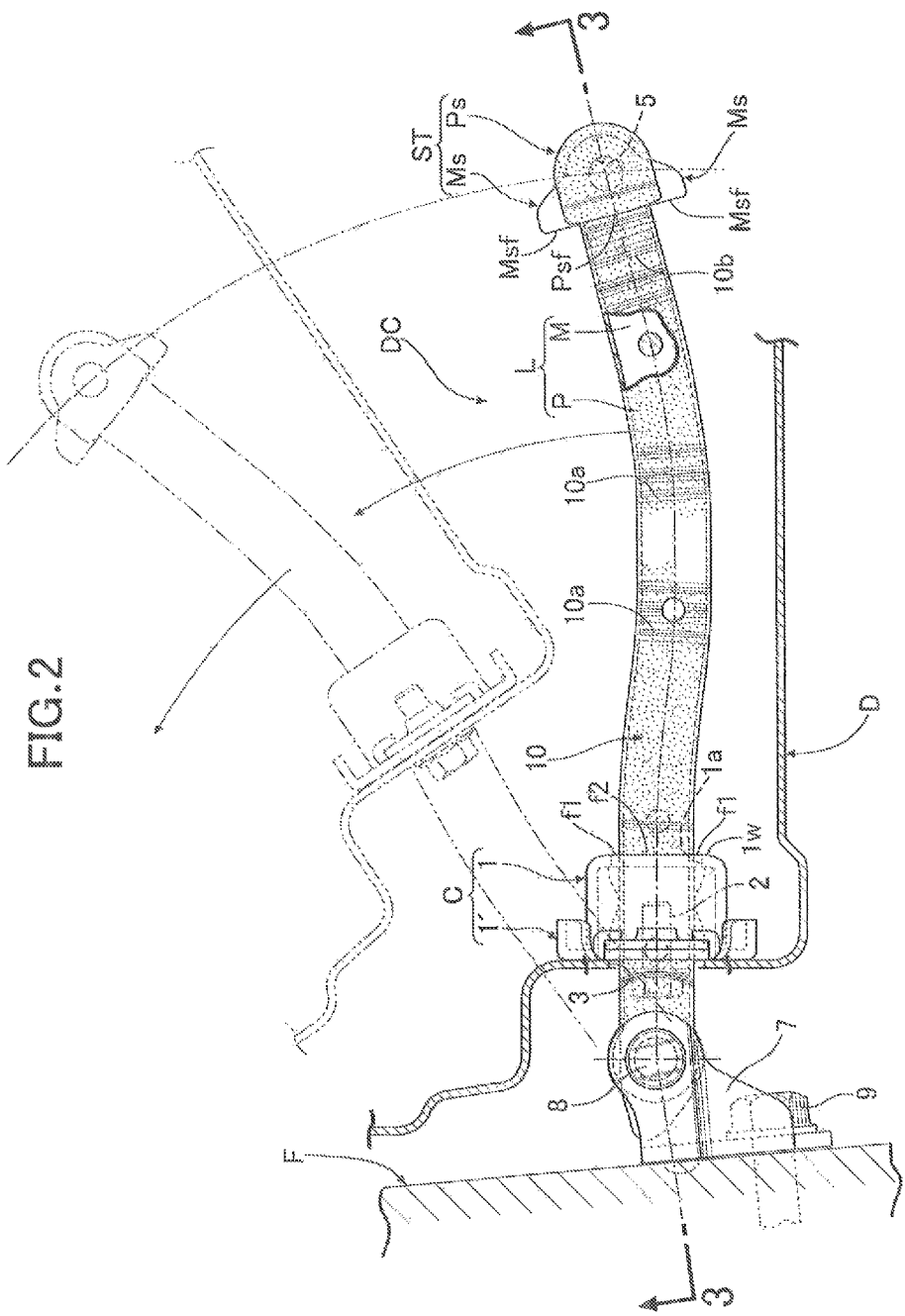
FIG. 2 is a plan view of the door checker.
Figure 3:
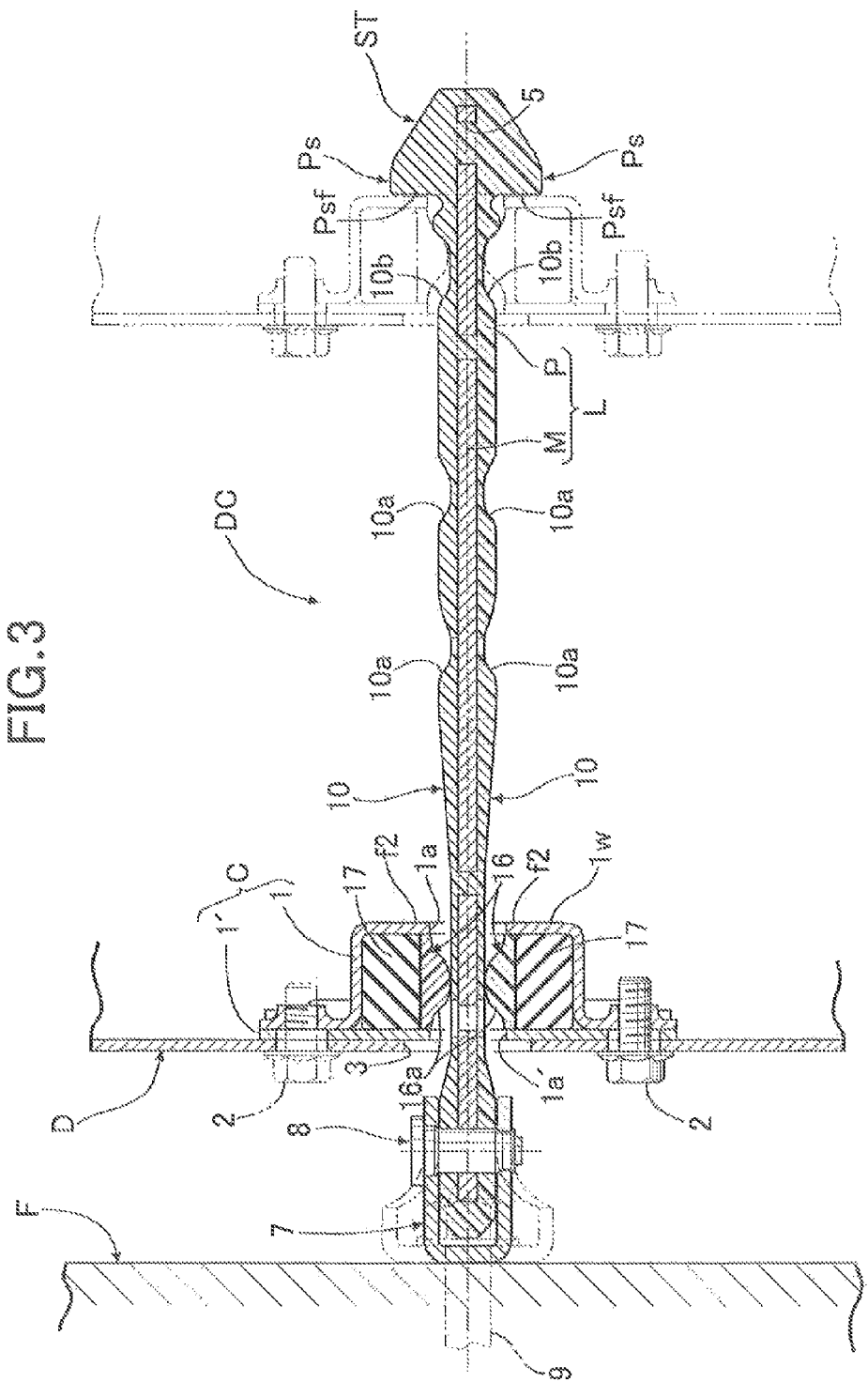
FIG. 3 is a sectional view taken along a 3-3 line in FIG. 2.
Figure 4:
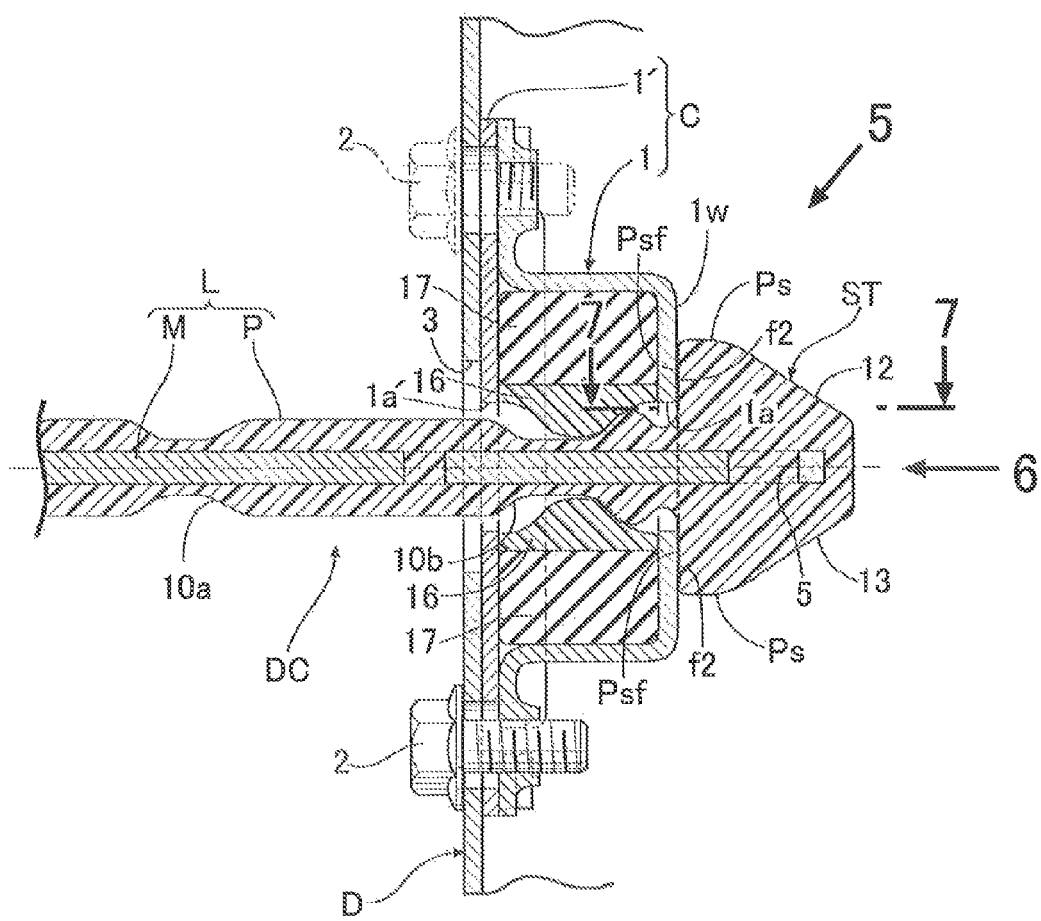
FIG. 4 is an enlarged sectional view of a main part of the door checker when a door is fully opened.
Figure 5:
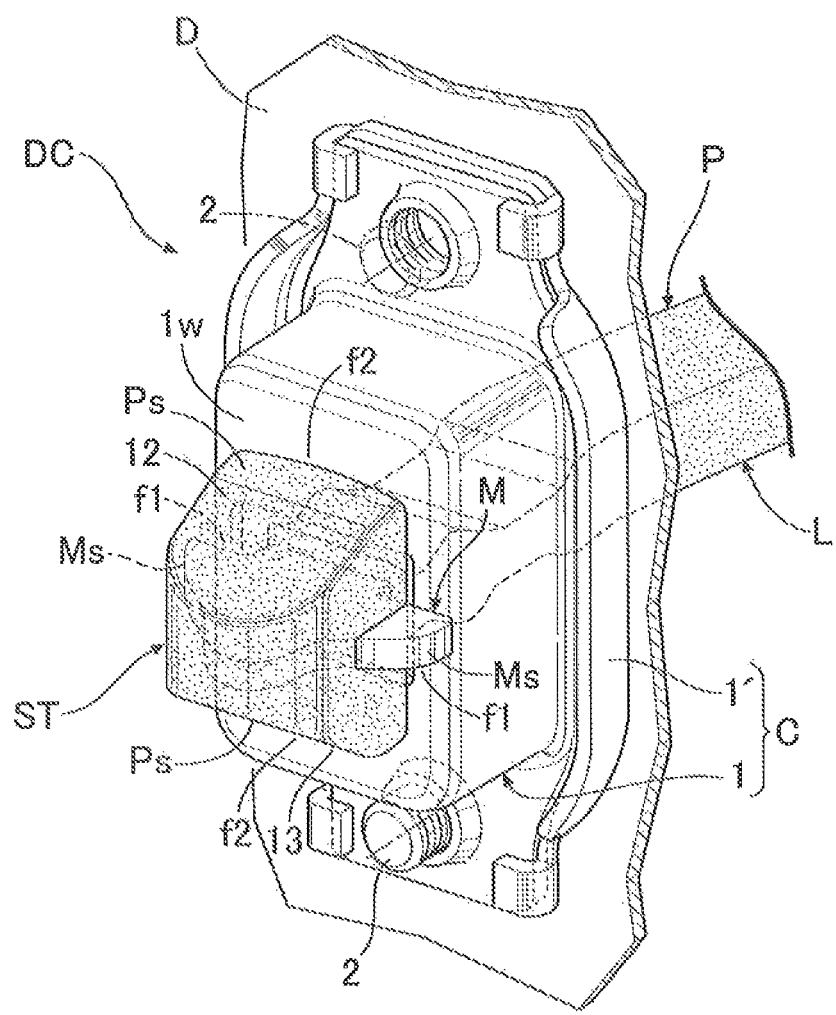
FIG. 5 is a perspective view of the main part of the door checker when the door is fully opened (a perspective view as seen in a direction of an arrow 5 in FIG. 4).
Figure 6:
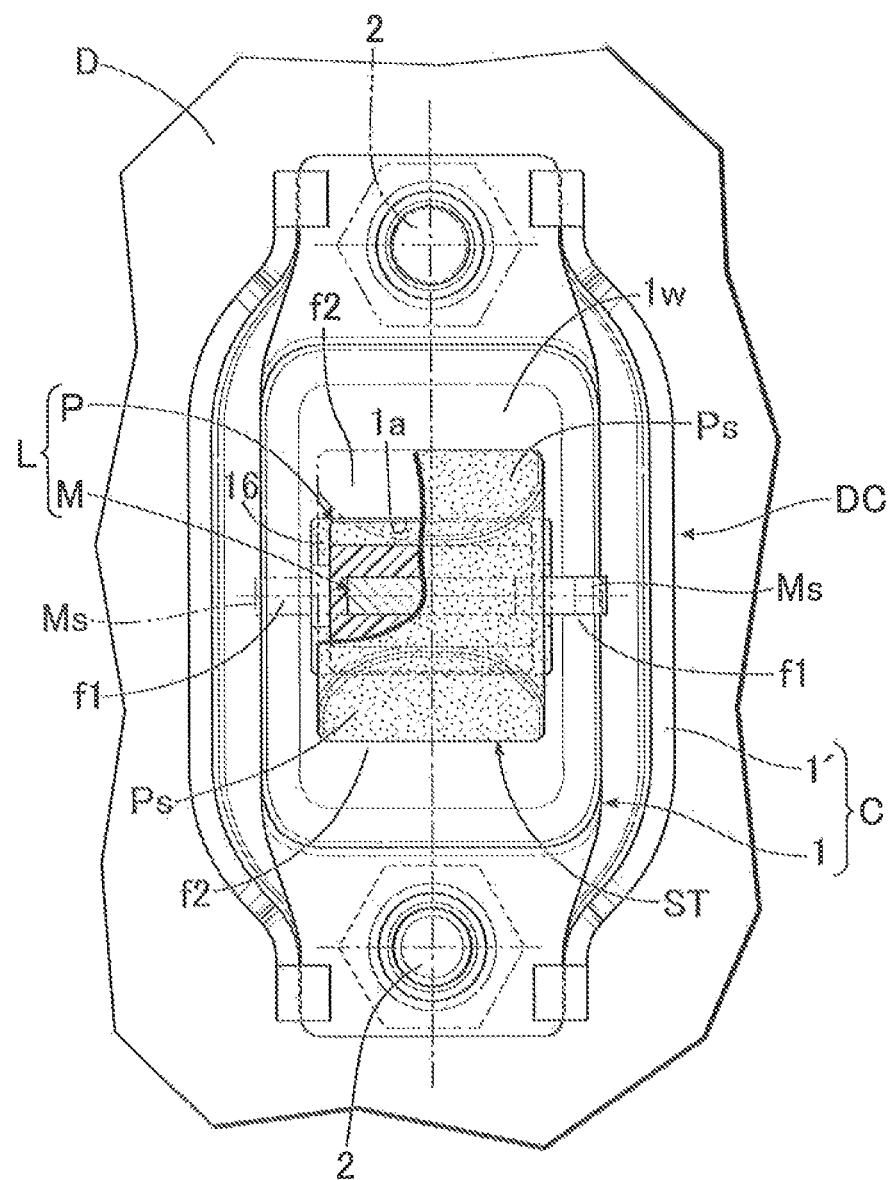
FIG. 6 is a view as seen in a direction of an arrow 6 in FIG. 4.

First of all, descriptions will be provided for an overall structure of a door checker. In FIG. 1, a door D for opening and closing an entrance is rotatably attached to a vehicle body F of an automobile via hinges H, and the door checker DC is attached between the vehicle body F and the door D.

As shown in FIGS. 2 to 6, the door checker DC includes a case C fixedly attached to an inner surface of an end wall of the door D. The case C is formed from: a case body 1 as a support body, having a box shape with one end opened, and obtained by press-forming a metal plate such as a steel plate or the like; and a cover 1' made of a metal plate such as a steel plate or the like, and connected to the case body 1 while covering the opened end of the case body 1. While abutting the cover 1' against the inner surface of the end wall of the door D, the case body 1 and the cover 1' are fastened to the end wall of the door D with a pair of upper and lower bolts 2.

A through-hole 3 is opened in the end wall of the door D. Through-holes 1a, 1a' arranged coaxially with the through-hole 3 are formed in a closed end wall 1w of the case body 1, and the cover 1', respectively. In addition, a base end portion of a check lever L slidably penetrating through the three through-holes 3, 1a, 1a' is rotatably connected via a pivot shaft 8 to a bracket 7 having an angular U-shape. The bracket 7 is fixedly attached to the vehicle body F with a bolt 9 while the pivot shaft 8, that is, a rotation axis of the check lever L is disposed in parallel with a pivot shaft of each hinge H.

The check lever L is disposed substantially horizontally. Opposite surfaces, upper and lower, of the check lever L form detent surfaces 10, respectively. The check lever L is formed from: a core plate M made of a steel plate, having a band plate-shape extending in a longitudinal direction of the lever, and connected to the bracket 7 so as to be disposed substantially horizontally; and a synthetic resin-made covering portion P which is integrally mold-bonded to the core plate M so as to cover a peripheral surface of the core plate M.

One or more half-open detent notches 10a are formed in an intermediate portion in a longitudinal direction of each of the upper and lower detent surfaces 10 of the check lever L which are formed from the synthetic resin-made covering portion P, while a full-open detent notch 10b is formed in each detent surface 10 in a free end portion, that is, in the vicinity of a tip end portion, of each detent surface 10. A full-open stopper ST adjacent to the full-open detent notch 10b is formed in a tip end portion of the check lever L. The full-open stopper ST forms a stopper of the present invention which defines an opening limit of the door D by being engaged with stopper surfaces f1, f2 that are set on an outer surface of the end wall 1w in a peripheral edge of the through-hole 1a of the case body 1. As described later, the full-open stopper ST is formed from a pair of first stopper portions Ms and a pair of second stopper portions Ps.

The outer surface of the end wall 1w of the case body 1 is formed as a rectangular flat surface which surrounds the through-hole 1a having a rectangular shape. The stopper surfaces f1, f2 include: a pair of first stopper surfaces f1 which sandwich therebetween the through-hole 1a in an outer surface of the case body 1 and are respectively arranged on left and right sides of the through-hole 1a; and a pair of second stopper surfaces f2 which sandwich therebetween the through-hole 1a and are respectively arranged on upper and lower sides of the through-hole 1a in a direction orthogonal to an arrangement direction of the first stopper surfaces f1 (in an up-down direction, in the illustrated example).

Furthermore, the full-open stopper ST is formed from: the pair of left and right first stopper portions Ms respectively engageable with the pair of first stopper surfaces f1; and the pair of upper and lower second stopper portions Ps respectively engageable with the pair of second stopper surfaces f2.

Of the stopper portions, the pair of first stopper portions Ms are formed from a pair of metal-made protrusions Ms respectively provided projectingly and integrally on opposite sides of a tip portion of the core plate M made of metal, and projecting from an outer surface of the synthetic resin-made covering portion P in directions opposite to each other (particularly, in a direction orthogonal to the axis of the check lever L in a horizontal plane). The protrusions Ms are always exposed from the covering portion P. Furthermore, a side end surface of each protrusion Ms on a tip end side of the check lever L is formed as an inclined surface which is inclined to a central axis side of the check lever L toward the tip end of the check lever L.

On the other hand, the pair of second stopper portions Ps are formed from a pair of upper and lower synthetic resin-made swelling portions Ps which are portions of the outer surface of the covering portion P located between the pair of first stopper portions Ms and integrally swollen on one side and an opposite side, respectively, in a direction orthogonal to an arrangement direction of the first stopper portions Ms (in an up-down direction, in the illustrated example). In the full-open stopper ST, as described above, the pair of metal-made first stopper portions Ms can be obtained by just projecting parts of the metal-made core plate M of the check lever L from an outer surface of the tip portion of the synthetic resin-made covering portion P, while the pair of synthetic resin-made second stopper portions Ps can be obtained by just swelling parts of the synthetic resin-made covering portion P. For this reason, the full-open stopper ST formed from the pair of first stopper portions Ms and the pair of second stopper portions Ps can be easily produced with low cost.

Figure 7A:
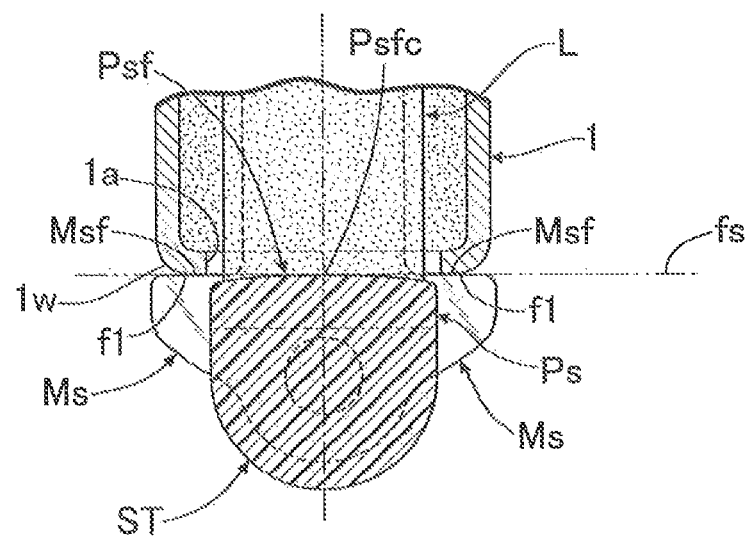
FIGS. 7A and 7B are sectional views for explaining how first and second stopper portions come into contact with first and second stopper surfaces when the door is fully opened.
Figure 7B:
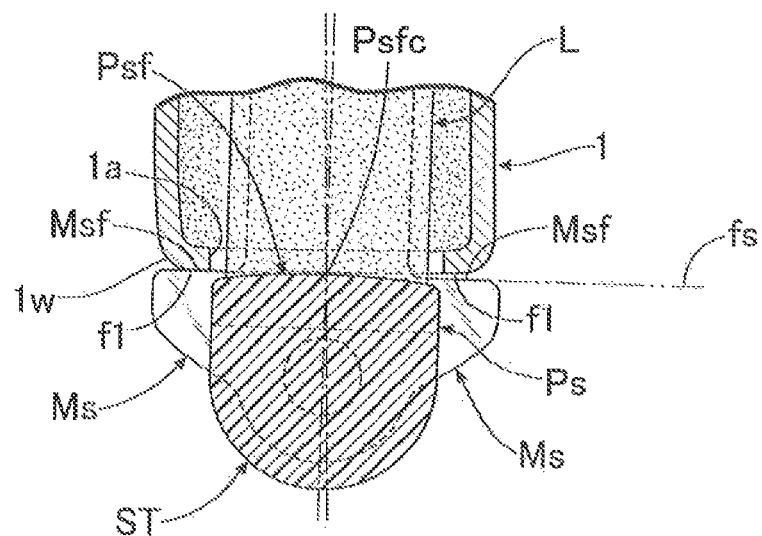

In addition, the pair of second stopper portions, namely, the swelling portions Ps, are arranged in a direction along the rotation axis of the check lever L. As shown in FIGS. 7A and 7B, surfaces Psf of the swelling portions Ps, which face the second stopper surfaces f2, are each formed in a convex arc shape as seen in a projection plane orthogonal to the rotation axis. In a free state of the check lever L, central portions Psfc of the surfaces Psf are formed so as to be situated on an imaginary plane fs passing through surfaces Msf of the pair of metal-made protrusions Ms (the first stopper portions) which face the first stopper surfaces f1. For this reason, in a case where when the door D reaches the opening limit, the full-open stopper ST of the check lever L is engaged with the stopper surfaces f1, f2 of the case body 1 in a proper contact posture (that is, in a posture not causing partial contact), timing when the protrusions Ms (the first stopper portions) are engaged with the first stopper surfaces f1 coincides with timing when the swelling portions Ps (the second stopper portions) are engaged with the second stopper surfaces f2.

Furthermore, an anchor hole 5 is penetratingly formed in a tip end portion of the metal-made core plate M, and is filled with part of the synthetic resin material of the covering portion P. The pair of swelling portions Ps are integrally connected together via the synthetic resin material in the anchor hole 5. Thereby, the pair of swelling portions Ps (the second stopper portions) made of synthetic rein can be integrally connected together via the synthetic resin material which is filled in the anchor hole 5 in the tip portion of the core plate M, the swelling portions Ps sandwiching the metal-made core plate M thereetween so as to be placed on opposite sides of the metal-made core plate M. For this reason, even if load produced by opening the door D is repeatedly applied to the swelling portions Ps, it is possible to effectively prevent the swelling portions Ps from coming off the core plate M.

Moreover, an upper surface 12 of the upper swelling portion Ps and a lower surface 13 of the lower swelling portion Ps are formed as inclined surfaces which become closer to each other toward the tip end of the check lever L. Respective tip end portions of the swelling portions Ps each have a tapered shape (a semi-arc shape, in the illustrated example) in a plan view, and are integrally connected together outside a tip end of the core plate M. Thereby, a projection amount of each of the swelling portions Ps to its surrounding space can be minimized while securing strength required for the swelling portion Ps. Accordingly, it is possible to effectively prevent the swelling portion Ps from interfering with components (for example, a door panel of the door D, a glass surface, and the like) around the swelling portion Ps. Furthermore, it is possible to minimize a use amount of resin, and to reduce weight and cost.

A pair of upper and lower synthetic resin-made detent members 16 are fitted and held in the case C so as to be slidable in a plate thickness direction of the check lever L, the detent members 16 holding the door D at a predetermined open position in cooperation with the pair of detent surfaces 10 of the check lever L. The detent members 16 each include an engagement portion 16a having a semi-cylindrical shape, and engageable with one of its corresponding half-open detent notches 10a and full-open detent notch 10b.

Furthermore, a pair of upper and lower elastic members 17, in a state of being compressed, are housed in the case C, the elastic members 17 elastically biasing the detent members 16 against the detent surfaces 10 of the check lever L, respectively. The elastic members 17 are each made of an elastic material such as elastomer or the like.

In addition, as the door D is opened from its full-closed position, the case C moves toward the free end portion of the check lever L, and simultaneously, the check lever L rotates around the pivot shaft 8. As the case C moves toward the free end portion of the check lever L, the engagement portions 16a of the detent members 16 slide on the detent surfaces 10 of the check lever L so as to go up the detent surfaces 10. Thereafter, when the door D reaches a predetermined half-open position, the engagement portions 16a of the detent members 16 fall into the half-open detent notches 10a of the check lever L due to elastic force of the elastic members 17. Thereby, torque to open the door D increases sharply so that the door D can be held at the predetermined half-open position.

Thereafter, further opening force is applied to the door D so that the engagement portions 16a of the detent members 16 go out of the half-open detent notches 10a. Subsequently, when the door D reaches a predetermined full-open position, the engagement portions 16a fall into the full-open detent notches 10b, and simultaneously, the case C (that is, the first and second stopper surfaces f1, f2 of the case body 1) is received by the full-open stopper ST (that is, the first and second stopper portions Ms, Ps). Thereby, the door D can be held at the full-open position.

Moreover, also in a process of closing the door D from the full-open position, in the same manner as the above, the engagement portions 16a of the detent members 16 is engaged with the half-open detent notches 10a so that the door D can be held at the predetermined half-open position. In addition, when the door D is further closed, the engagement portions 16a of the detent members 16 slide on the detent surfaces 10 of the check lever L so as to go down the detent surfaces 10. Thereby, closing of the door D can be achieved lightly.

As for the pair of synthetic resin-made swelling portions Ps (the second stopper portions) of the check lever L of the embodiment, their surfaces Psf facing the respective second stopper surfaces f2 are each formed in a convex arc shape, while the central portions Psfc of the surfaces Psf are formed to be situated on the imaginary plane fs passing through the surfaces Msf of the pair of metal-made protrusions Ms (the first stopper portions) which face the first stopper surfaces f1. For this reason, in a case where when the door D reaches the predetermined full-open position, as shown in FIG. 7A, the full-open stopper ST of the check lever L is engaged with the stopper surfaces f1, f2 of the case body 1 in the proper contact posture (that is, a posture in which: the axis of the check lever L is in parallel with a central axis of the through-hole 1a of the case body 1; and the pair of metal-made protrusions Ms (the first stopper portions) of the check lever L come into parallel and simultaneous contact with the pair of first stopper surfaces f1 of the case body 1), the pair of synthetic resin-made swelling portions Ps (the second stopper portions) are engaged with the second stopper surfaces f2 at the same time as the pair of metal-made protrusions Ms (the first stopper portions) are engaged with the first stopper surfaces f1.

This makes it possible for the first and second stopper portions Ms, Ps as well as the first and second stopper surfaces f1, f2 to receive the load produced by opening the door D in a way that the load is widely dispersed over the case C. For this reason, load burden on the stopper surfaces f1, f2 of the case C can be reduced using a simple structure as a whole. Furthermore, it is possible to inhibit excessive deformation of the synthetic resin-made second stopper portions Ps, and to effectively reduce load burden thereon. Thus, it is possible to effectively inhibit the deformation and abrasion of the case body 1 even though the case body 1 is formed from a press-formed metal plate or the like, and it is possible to effectively inhibit failures, such as abrasion, damage, separation and the like, of the synthetic resin-made swelling portions Ps (the second stopper portions). Accordingly, it is possible to enhance durability of various parts of the door checker DC.

On the other hand, in a case where as shown in FIG. 7B, the full-open stopper ST of the check lever L is engaged with the stopper surfaces f1, f2 of the case body 1 in a partial contact posture (that is, a posture in which: the axis of the check lever L inclines relative to the central axis of the through-hole 1a of the case body 1; and only one of the pair of metal-made protrusions Ms (the first stopper portions) of the check lever L is engaged with its corresponding first stopper surface f1, and the other metal-made protrusion Ms is slightly away from its corresponding first stopper surface f1), the one metal-made protrusion Ms (the first stopper portion) is engaged with its corresponding first stopper surface f1, and thereafter, the pair of synthetic resin-made swelling portions Ps (the second stopper portions) are engaged with the second stopper surfaces f2.

In the other words, when the load produced by opening the door D is applied unevenly and concentratedly to the one first stopper surface f1 with which the one metal-made protrusion Ms comes in contact due to partial contact, the case body 1 may be deformed in the one first stopper surface f1 and its vicinity so that the one first stopper surface f1 may be instantaneously and slightly set back. In this case, the synthetic resin-made swelling portions Ps (the second stopper portions), which have been slightly away from the second stopper surfaces f2 due to the partial contact, are engaged with the second stopper surfaces f2. Thereby, dispersion of the load produced by opening the door can be achieved via the second stopper surfaces f2 as well. Accordingly, the load burden on the case body 1 is reduced that much, and durability of the case body 1 is enhanced. Furthermore, since the contact surfaces of the synthetic resin-made swelling portions Ps with the second stopper surfaces f2, namely, the surfaces Psf, each have a cross section with a convex arc shape, surface contact of the surfaces Psf with the second stopper surfaces f2 is satisfactory so that stress on the contact parts can be dispersed. Accordingly, the durability of the synthetic resin-made swelling portions Ps can be enhanced further.

Figure 8A:
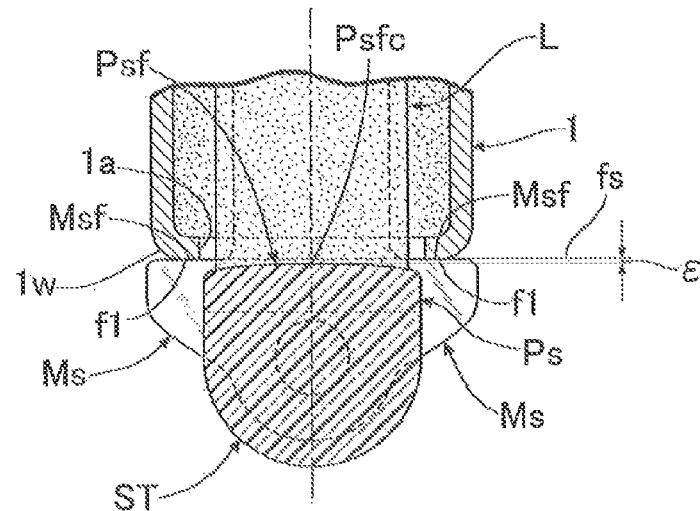
FIGS. 8A and 8B are sectional views corresponding to FIGS. 7A and 7B and each showing a door checker of a second embodiment of the present invention.
Figure 8B:
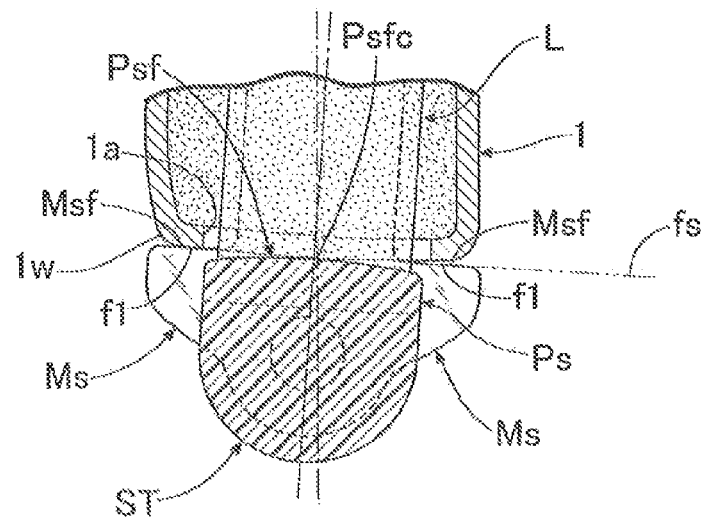

Next, referring to FIGS. 8A and 8B, descriptions will be provided for a second embodiment of the present invention. In this embodiment, in a free state of the full-open stopper ST of the check lever L, the pair of synthetic resin-made swelling portions Ps (the second stopper portions) are formed such that the convex central portions Psfc in the surfaces Psf of the swelling portions Ps, which face the second stopper surfaces f2, retreat, by a predetermined amount $\epsilon$ in a direction opposite from the second stopper surfaces f2, from the imaginary plane fs passing through the surfaces Msf of the pair of metal-made protrusions Ms (the first stopper portions) which face the first stopper surfaces f1. In the other respects, the structure of the second embodiment is the same as that of the first embodiment.

For this reason, in the second embodiment, in a case where when the door D reaches the predetermined full-open position, as shown in FIG. 8A, the full-open stopper ST of the check lever L is engaged with the stopper surfaces f1, f2 of the case body 1 in the proper contact posture, first of all, the pair of metal-made protrusions Ms (the first stopper portions) are engaged with the pair of the first stopper surfaces f1. When the case body 1 is deformed due to impact caused by the engagement, and the first stopper surfaces f1 are slightly set back, the pair of synthetic resin-made swelling portions Ps (the second stopper portions) are engaged with the second stopper surfaces f2. Thereby, the load produced by opening the door can be securely received mainly by engagement of the metal-made protrusions Ms (the first stopper portions) with the pair of first stopper surfaces f1, and load burden on the pair of synthetic resin-made swelling portions Ps (the second stopper portions) can be reduced to a large extent.

On the other hand, in a case where, as shown in FIG. 8B, the full-open stopper ST of the check lever L is engaged with the stopper surfaces f1, f2 of the case body 1 in the partial contact posture, one metal-made protrusion Ms (the first stopper portion) is engaged with its corresponding first stopper surface f1, and thereafter, the pair of synthetic resin-made swelling portions Ps (the second stopper portions) are engaged with the second stopper surfaces f2. In the other words, when the load produced by opening the door D is applied unevenly and concentratedly to the first stopper surface f1 with which the one metal-made protrusion Ms comes in contact due to partial contact, the case body 1 may be deformed in the one first stopper surface f1 and its vicinity so that the one first stopper surface f1 may be instantaneously and slightly set back. In this case, the synthetic resin-made swelling portions Ps (the second stopper portions), which have been slightly away from the second stopper surfaces f2 due to the partial contact, are engaged with the second stopper surfaces f2. Thereby, dispersion of the load produced by opening the door can be achieved via the second stopper surfaces f2 as well. For this reason, a similar effect to that of the first embodiment can be expected.

Next, referring to FIGS. 9A to 9C, descriptions will be provided for a third embodiment of the present invention. In this embodiment, in a free state of the full-open stopper ST of the check lever L, the pair of synthetic resin-made swelling portions Ps (the second stopper portions) are formed such that the convex central portions Psfc in the surfaces Psf of the swelling portions Ps, which face the second stopper surfaces f2, project, by a predetermined amount $\epsilon'$ toward the second stopper surfaces f2, from the imaginary plane fs passing through the surfaces Msf of the pair of metal-made protrusions Ms (the first stopper portions) which face the first stopper surfaces f1. In the other respects, the structure of the third embodiment is the same as that of the first embodiment.

For this reason, in the third embodiment, in a case where when the door D reaches the predetermined full-open position, as shown in FIG. 9A, the full-open stopper ST of the check lever L is engaged with the stopper surfaces f1, f2 of the case body 1 in the proper contact posture, first of all, the pair of synthetic resin-made swelling portions Ps (the second stopper portions) are engaged with the second stopper surfaces f2. After the engagement, as shown in FIG. 9B, the pair of metal-made protrusions Ms (the first stopper portions) are engaged with the pair of the first stopper surfaces f1.

Thereby, at the opening limit of the door D, when the full-open stopper ST is engaged with the stopper surfaces f1, f2, first of all, impact caused by the engagement is effectively absorbed and eased by elastic deformation of the pair of synthetic resin-made swelling portions Ps (the second stopper portions). Thereafter, the pair of metal-made protrusions Ms (the first stopper portions) are engaged with the pair of the first stopper surfaces f1. Therefore, occurrence of impact noise is effectively prevented. Furthermore, since eventually, the pair of metal-made protrusions Ms (the first stopper portions) are engaged with the first stopper surfaces f1, excessive elastic deformation of the synthetic resin-made swelling portions Ps (the second stopper portions) can be securely avoided. In addition, the contact surfaces Psf of the synthetic resin-made swelling portions Ps (the second stopper portions) with the second stopper surfaces f2 each have a cross section with a convex arc shape so that surface contact is satisfactory so as to disperse stress of the contact parts. For this reason, it is possible to further enhance the durability of the synthetic resin-made swelling portions Ps (the second stopper portions). The third embodiment also makes it possible for the first and second stopper surfaces f1, f2 to receive the load produced by opening the door in a way that the load is widely dispersed over the case C. Accordingly, load burden on the first and second stopper surfaces f1, f2 of the case C can be reduced using a simple structure as a whole, and the similar effect to that of the first embodiment can be expected.

Furthermore, in a case where, as shown in FIG. 9C, the full-open stopper ST of the check lever L is engaged with the stopper surfaces f1, f2 of the case body 1 in the partial contact posture, the pair of synthetic resin-made swelling portions Ps (the second stopper portions) are engaged with the second stopper surfaces f2, before, after, or substantially simultaneously with, engagement of one metal-made protrusion Ms (the first stopper portion) with its corresponding first stopper surface f1. In this case, when the load produced by opening the door D is applied unevenly and concentratedly to the one first stopper surface f1 with which the one metal-made protrusion Ms comes in contact due to the partial contact, the case body 1 may be deformed in the one first stopper surface f1 and its vicinity so that the one first stopper surface f1 may be instantaneously and slightly set back. In this case, however, the dispersion of the load produced by opening the door can be achieved via the second stopper surfaces f2 as well since the pair of synthetic resin-made swelling portions Ps (the second stopper portions) are in the state of being in engagement with the second stopper surfaces f2. For this reason, the similar effect to that of the first embodiment can be expected.

Figure 10A:
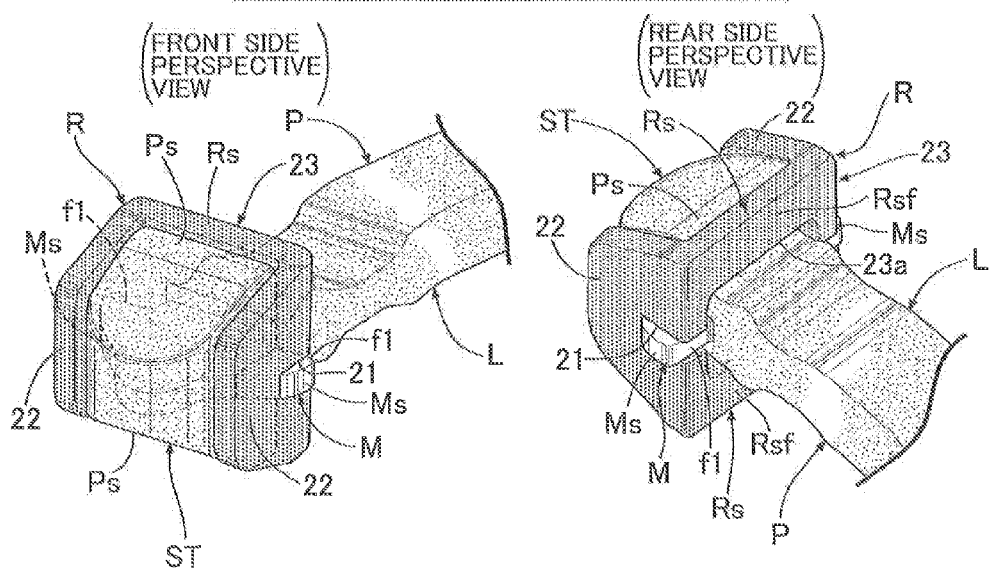
FIGS. 10A and 10B are perspective views showing a main part of a door checker of a fourth embodiment of the present invention.
Figure 10B:
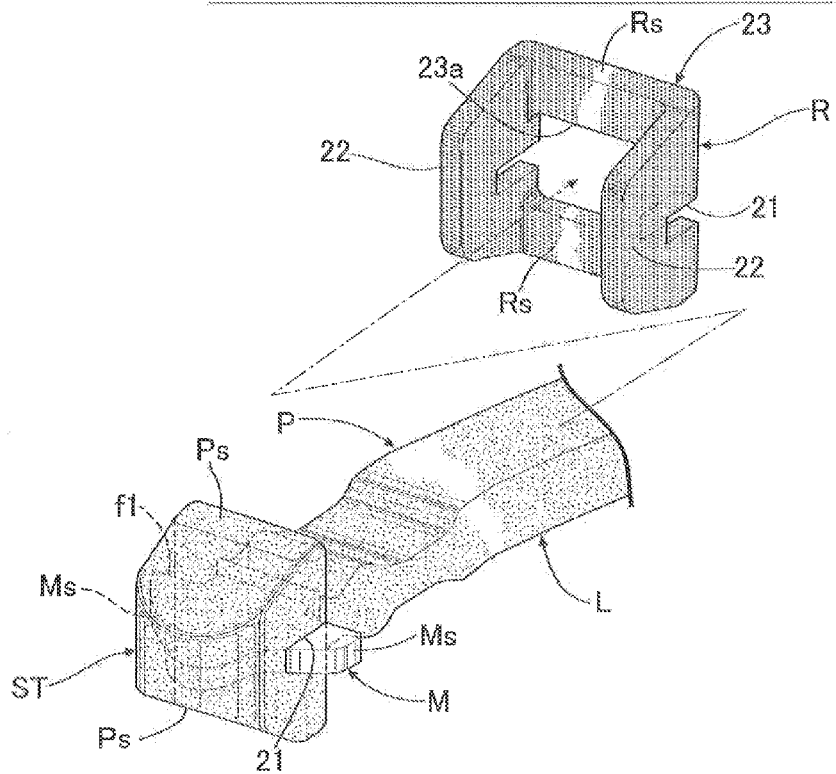
Figure 11:
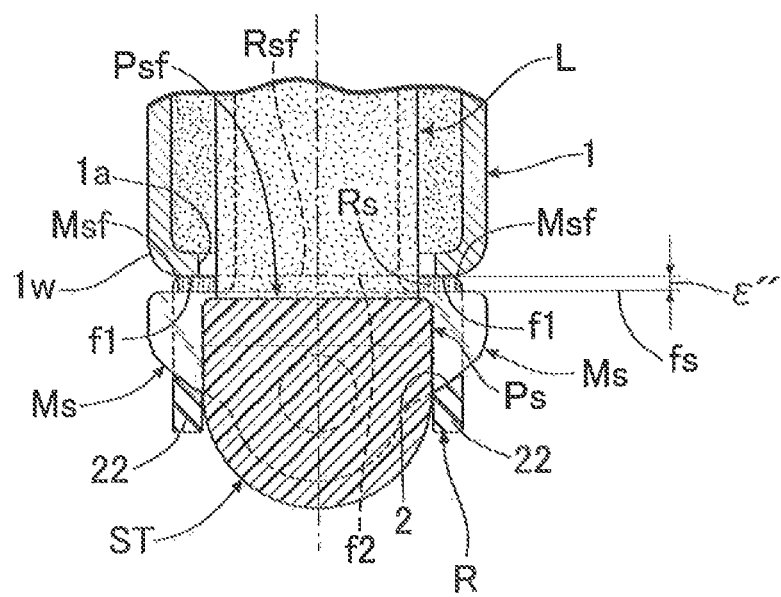
FIG. 11 is a sectional view corresponding to FIGS. 7A and 7B and showing the door checker of the fourth embodiment of the present invention.

Next, referring to FIGS. 10A, 10B and 11, descriptions will be provided for a fourth embodiment of the present invention. In this embodiment, a rubber cover R is detachably attached to a tip portion of the check lever L of the foregoing first or second embodiment, the rubber cover R integrally including a pair of rubber covering portions Rs which cover the surfaces Psf of the pair of swelling portions Ps (the second stopper portions) facing the second stopper surfaces f2. It should be noted that the surfaces Psf may be each formed as a flat surface as shown in the illustrated example, or as the convex arc surface as in the case of the first and second embodiments.

The rubber cover R includes a pair of left and right cover side walls 22 and an intermediate wall 23 integrally connecting the cover side walls 22, so as to be integrally molded in an angular U-shape in a plan view. An insertion hole 23a for insertion therethrough of the tip portion of the check lever L (particularly, the portion closer to a base portion of the lever from the full-open stopper ST) is formed in the intermediate wall 23. Portions of the intermediate wall 23 above and under the insertion hole 23a form the pair of rubber covering portions Rs. It should be noted that a predetermined interference is set between the rubber cover R and the tip portion of the check lever L such that the rubber cover R and the tip portion are frictionally connected together. The interference may be set, for example, between the left cover side wall 22 and the synthetic resin-made swelling portions Ps and between the right cover side wall 22 and the synthetic resin-made swelling portions Ps, the swelling portions Ps being interposed between the left and right cover side walls 22, or the interference may be set between the insertion hole 23a and an outer periphery of the tip portion of the check lever L which is inserted through the insertion hole 23a. Furthermore, instead of the above-mentioned fictional engagement means, other appropriate connection means (for example, bonding means, lock means formed from a lock claw portion and a locked portion which are able to be engaged with and disengaged from each other, or the like) may be provided between the rubber cover R and the tip portion of the check lever L.

A cutout 21 for exposing therethrough, to the outside, the surfaces Msf of the pair of metal-made protrusions Ms (the first stopper portions), which face the first stopper surfaces f1, is formed in the rubber cover R. In the illustrated example, the cutout 21 is formed so as to straddle the cover side walls 22 and the intermediate wall 23. Incidentally, instead of the cutout 21, a through-hole for exposing therethrough, to the outside, the surfaces Psf may be formed in the rubber cover R.

Furthermore, surfaces Rsf of the rubber covering portions Rs which face the second stopper surfaces f2 are each formed as a flat surface, and project, by a predetermined amount $\epsilon''$ toward the second stopper surfaces f2 side, from the imaginary plane fs passing through the surfaces Msf of the metal-made protrusions Ms (the first stopper portions) which face the first stopper surfaces f1. Thereby, when the door D is fully-opened, the rubber covering portions Rs are elastically deformable until the metal-made protrusions Ms (the first stopper portions) are engaged with the first stopper surfaces f1.

Thus, in the fourth embodiment, when the door D is opened, the rubber covering portions Rs of the rubber cover R shock-absorbingly abut against the second stopper surfaces f2 immediately before the opening limit of the door D which is restricted by engagement of the full-open stopper ST with the stopper surfaces f1, f2. Thereby, the rubber covering portions Rs are capable of effectively absorbing and easing impact which is caused when the full-open stopper ST receives the load produced by opening the door D. Accordingly, the shock-absorbing effect enhances the durability of the synthetic resin-made swelling portions Ps (the second stopper portions) and the case body 1, and can effectively reduce impact load on the door D supporting the case body 1, or the vehicle body F. Moreover, since the cutout 21 for exposing therethrough, to the outside, the surfaces Msf of the pair of metal-made protrusions Ms (the first stopper portions) facing the first stopper surfaces f1 is formed in the rubber cover R, it is possible to securely restrict the opening limit of the door D by engaging the metal-made protrusions Ms (the first stopper portions) directly with the first stopper surfaces f1 with no rubber cover R interposed therebetween, and to effectively prevent damage of the rubber cover R due to the engagement.

The present invention is not limited to the foregoing embodiments, and various design changes may be made to the present invention within a scope not departing from the gist of the present invention.

For example, the foregoing embodiments have shown the vehicle door checker in which: the base portion of the check lever L is pivotally supported by the bracket 7 fixed to the vehicle body F side; and the support body (the case body 1) which includes the stopper surfaces f1, f2 engageble with the full-open stopper ST provided to the tip portion of the check lever L is fixed to the door D. Nevertheless, in the present invention, contrary to the above, the base portion of the check lever L may be pivotally supported by a bracket fixed to the door D side; and the support body (the case body 1) having the stopper surfaces f1, f2 engageble with the full-open stopper ST may be fixed to the vehicle body F side.

What is claimed is:

1. A vehicle door checker comprising:
   a check lever having a base portion pivotally supported by one of a vehicle body and a door;
   a support body made of a metal plate, including a through-hole for slidable insertion of the check lever therethrough, and fixedly attached to the other of the vehicle body and the door; and
   a stopper provided to a tip portion of the check lever and defining an opening limit of the door by engaging with stopper surfaces provided to an outer surface of a peripheral edge of the through-hole in the support body, wherein
   the check lever includes
      a metal-made core plate extending in a longitudinal direction of the lever, and
      a synthetic resin-made covering portion integrally covering the core plate,
   wherein the stopper surfaces includes
      a pair of first stopper surfaces arranged side-by-side with the through-hole interposed therebetween, and
      a pair of second stopper surfaces arranged side-by-side with the through-hole interposed therebetween in a direction orthogonal to an arrangement direction of the first stopper surfaces,
   the stopper is formed from
      a pair of first stopper portions engageable with the pair of first stopper surfaces, respectively, and
      a pair of second stopper portions engageable with the pair of second stopper surfaces, respectively,
   the pair of first stopper portions are formed from a pair of metal-made protrusions provided projectingly and integrally on opposite sides of a tip portion of the core plate and projecting from an outer surface of the covering portion, and
   the pair of second stopper portions are formed from a pair of synthetic resin-made swelling portions which are portions of the outer surface of the covering portion located between the pair of first stopper portions and swollen on one side and an opposite side, respectively, in a direction orthogonal to an arrangement direction of the first stopper portions.

2. The vehicle door checker according to claim 1, wherein the pair of second stopper portions are arranged in a direction along a rotation axis of the check lever, surfaces of the second stopper portions, which face the second stopper surfaces, are each formed in a convex arc shape as seen in a projection plane orthogonal to the rotation axis, and the surfaces of the second stopper portions, which face the second stopper surfaces, are formed such that central portions of the surfaces of the second stopper portions are placed on an imaginary plane passing through surfaces of the pair of first stopper portions which face the first stopper surfaces, respectively, or such that the central portions of the surfaces of the second stopper portions retreat from the imaginary plane by a predetermined amount in a direction opposite from the second stopper surfaces.

3. The vehicle door checker according to claim 2, wherein
   an anchor hole is penetratingly formed in the tip portion of the core plate, and is filled with the synthetic resin material of the covering portion, and
   the pair of second stopper portions are integrally connected together via the synthetic resin material in the anchor hole.

4. The vehicle door checker according to claim 3, wherein
   a rubber cover integrally including a pair of rubber covering portions is attached to the tip portion of the check lever, the pair of rubber covering portions covering the surfaces of the pair of second stopper portions which face the second stopper surfaces,
   the rubber cover is provided with any one of a through-hole and a cutout through which the surfaces of the pair of first stopper portions facing the first stopper surfaces are exposed to outside, and
   surfaces of the rubber covering portions which face the second stopper surfaces project, by a predetermined amount, toward the second stopper surfaces from the imaginary plane passing through the surfaces of the pair of first stopper portions which face the first stopper surfaces.

5. The vehicle door checker according to claim 2, wherein
   a rubber cover integrally including a pair of rubber covering portions is attached to the tip portion of the check lever, the pair of rubber covering portions covering the surfaces of the pair of second stopper portions which face the second stopper surfaces,
   the rubber cover is provided with any one of a through-hole and a cutout through which the surfaces of the pair of first stopper portions facing the first stopper surfaces are exposed to outside, and
   surfaces of the rubber covering portions which face the second stopper surfaces project, by a predetermined amount, toward the second stopper surfaces from the imaginary plane passing through the surfaces of the pair of first stopper portions which face the first stopper surfaces.

6. The vehicle door checker according to claim 1, wherein the pair of second stopper portions are arranged in a direction along a rotation axis of the check lever, surfaces of the second stopper portions, which face the second stopper surfaces, are each formed in a convex arc shape as seen in a projection plane orthogonal to the rotation axis, and the surfaces of the second stopper portions, which face the second stopper surfaces, are formed such that central portions of the surfaces of the second stopper portions project, by a predetermined amount, toward the second stopper surfaces from an imaginary plane passing through surfaces of the pair of first stopper portions which face the first stopper surfaces, respectively.

7. The vehicle door checker according to claim 6, wherein
   an anchor hole is penetratingly formed in the tip portion of the core plate, and is filled with the synthetic resin material of the covering portion, and the pair of second stopper portions are integrally connected together via the synthetic resin material in the anchor hole.

8. The vehicle door checker according to claim 7, wherein a rubber cover integrally including a pair of rubber covering portions is attached to the tip portion of the check lever, the pair of rubber covering portions covering the surfaces of the pair of second stopper portions which face the second stopper surfaces, the rubber cover is provided with any one of a through-hole and a cutout through which the surfaces of the pair of first stopper portions facing the first stopper surfaces are exposed to outside, and surfaces of the rubber covering portions which face the second stopper surfaces project, by a predetermined amount, toward the second stopper surfaces from the imaginary plane passing through the surfaces of the pair of first stopper portions which face the first stopper surfaces.

9. The vehicle door checker according to claim 6, wherein a rubber cover integrally including a pair of rubber covering portions is attached to the tip portion of the check lever, the pair of rubber covering portions covering the surfaces of the pair of second stopper portions which face the second stopper surfaces, the rubber cover is provided with any one of a through-hole and a cutout through which the surfaces of the pair of first stopper portions facing the first stopper surfaces are exposed to outside, and surfaces of the rubber covering portions which face the second stopper surfaces project, by a predetermined amount, toward the second stopper surfaces from the imaginary plane passing through the surfaces of the pair of first stopper portions which face the first stopper surfaces.

10. The vehicle door checker according to claim 1, wherein an anchor hole is penetratingly formed in the tip portion of the core plate, and is filled with the synthetic resin material of the covering portion, and the pair of second stopper portions are integrally connected together via the synthetic resin material in the anchor hole.

11. The vehicle door checker according to claim 10, wherein a rubber cover integrally including a pair of rubber covering portions is attached to the tip portion of the check lever, the pair of rubber covering portions covering the surfaces of the pair of second stopper portions which face the second stopper surfaces, the rubber cover is provided with any one of a through-hole and a cutout through which the surfaces of the pair of first stopper portions facing the first stopper surfaces are exposed to outside, and surfaces of the rubber covering portions which face the second stopper surfaces project, by a predetermined amount, toward the second stopper surfaces from the imaginary plane passing through the surfaces of the pair of first stopper portions which face the first stopper surfaces.

12. The vehicle door checker according to claim 1, wherein a rubber cover integrally including a pair of rubber covering portions is attached to the tip portion of the check lever, the pair of rubber covering portions covering the surfaces of the pair of second stopper portions which face the second stopper surfaces, the rubber cover is provided with any one of a through-hole and a cutout through which the surfaces of the pair of first stopper portions facing the first stopper surfaces are exposed to outside, and surfaces of the rubber covering portions which face the second stopper surfaces project, by a predetermined amount, toward the second stopper surfaces from the imaginary plane passing through the surfaces of the pair of first stopper portions which face the first stopper surfaces.

* * * * *